United States Patent
Falk et al.

(10) Patent No.: US 12,375,320 B2
(45) Date of Patent: Jul. 29, 2025

(54) TRANSMISSION DEVICE FOR TRANSMITTING DATA AND DETECTING ANOMALIES

(71) Applicant: Siemens Mobility GmbH, Bayern (DE)

(72) Inventors: Rainer Falk, Poing (DE); Christina Otto, Munich (DE); Heiko Patzlaff, Munich (DE); Martin Wimmer, Neubiberg (DE)

(73) Assignee: Siemens Mobility GmbH, Bayern (DE)

( * ) Notice: Subject to any disclaimer, the term of this patent is extended or adjusted under 35 U.S.C. 154(b) by 532 days.

(21) Appl. No.: 17/783,774

(22) PCT Filed: Dec. 10, 2020

(86) PCT No.: PCT/EP2020/085502
§ 371 (c)(1),
(2) Date: Jun. 9, 2022

(87) PCT Pub. No.: WO2021/122293
PCT Pub. Date: Jun. 24, 2021

(65) Prior Publication Data
US 2023/0030504 A1    Feb. 2, 2023

(30) Foreign Application Priority Data
Dec. 19, 2019  (DE) ..................... 10 2019 220 248.9

(51) Int. Cl.
*H04L 12/46*  (2006.01)
*H04L 9/40*  (2022.01)
(52) U.S. Cl.
CPC .......... *H04L 12/46* (2013.01); *H04L 63/1425* (2013.01)
(58) Field of Classification Search
CPC ..................... H04L 12/46; H04L 63/1425
See application file for complete search history.

(56) References Cited

U.S. PATENT DOCUMENTS 9,032,478 B2 *   5/2015  Ballesteros ............. H04L 63/20
                                                                726/3
10,609,029 B2 *  3/2020  Leconte ............ H04L 12/40032
                           (Continued)

FOREIGN PATENT DOCUMENTS

CN         2588677 Y      11/2003
CN       104486336 A       4/2015
                           (Continued)

OTHER PUBLICATIONS

PCT International Search Report mailed Mar. 18, 2021 corresponding to PCT International Application No. PCT/EP2020/085502 filed Oct. 12, 2020.
(Continued)

*Primary Examiner* — Jael M Ulysse
(74) *Attorney, Agent, or Firm* — Schmeiser, Olsen & Watts LLP

(57) ABSTRACT

A transmission device for transmitting data between a first network and a second network is provided. The transmission device includes a first network port for coupling to the first network and a second network port for coupling to the second network, and the transmission device further includes: a first detection unit which is connected to the first network port and is configured to receive data transmitted by the first network via the first network port and to detect anomalies with respect to the received data, and a second detection unit which is connected to the second network port and is configured to receive data transmitted by the second network via the second network port and to detect anomalies with respect to the received data. The provided transmission device leads to an optimized detection of anomalies in the first and the second network, thereby increasing security during data transmission between the first and the second network.

14 Claims, 1 Drawing Sheet

(56) References Cited

U.S. PATENT DOCUMENTS

| | | | | |
|---|---|---|---|---|
| 2001/0039579 | A1* | 11/2001 | Trcka | G06F 21/552 709/224 |
| 2003/0191857 | A1* | 10/2003 | Terrell | H04L 49/90 709/244 |
| 2004/0199535 | A1* | 10/2004 | Zuk | H04L 63/1425 707/999.102 |
| 2005/0050221 | A1* | 3/2005 | Tasman | H04W 52/46 709/232 |
| 2005/0076227 | A1* | 4/2005 | Kang | H04L 63/1416 713/188 |
| 2005/0125195 | A1* | 6/2005 | Brendel | H04L 63/1425 702/182 |
| 2006/0140127 | A1* | 6/2006 | Lee | H04L 43/18 370/389 |
| 2007/0094728 | A1* | 4/2007 | Julisch | H04L 63/1491 726/23 |
| 2007/0118568 | A1* | 5/2007 | Kitani | H04L 41/12 |
| 2007/0186284 | A1* | 8/2007 | McConnell | H04L 63/1425 726/25 |
| 2007/0192863 | A1* | 8/2007 | Kapoor | H04L 67/10 726/23 |
| 2007/0206497 | A1* | 9/2007 | Plamondon | H04L 67/2876 370/231 |
| 2007/0283436 | A1* | 12/2007 | Duffield | H04L 63/1425 726/23 |
| 2008/0262990 | A1* | 10/2008 | Kapoor | H04L 63/145 706/20 |
| 2008/0262991 | A1* | 10/2008 | Kapoor | H04L 63/14 706/20 |
| 2011/0213869 | A1* | 9/2011 | Korsunsky | G06F 21/55 709/223 |
| 2011/0231510 | A1* | 9/2011 | Korsunsky | G06F 21/55 709/213 |
| 2012/0060219 | A1* | 3/2012 | Larsson | G06F 21/554 726/23 |
| 2012/0110356 | A1* | 5/2012 | Yousefi | G08G 1/16 713/320 |
| 2012/0151593 | A1* | 6/2012 | Kang | H04L 43/026 726/25 |
| 2012/0278890 | A1* | 11/2012 | Maatta | H04L 43/062 726/23 |
| 2014/0201838 | A1* | 7/2014 | Varsanyi | G06F 21/552 726/23 |
| 2014/0211614 | A1* | 7/2014 | Winn | H04L 41/0668 370/225 |
| 2014/0223563 | A1* | 8/2014 | Durie | H04L 63/0263 726/23 |
| 2014/0304813 | A1* | 10/2014 | Ma | H04L 63/1408 726/22 |
| 2015/0106927 | A1* | 4/2015 | Ferragut | H04L 63/1433 726/23 |
| 2016/0112443 | A1* | 4/2016 | Grossman | H04L 63/1416 726/23 |
| 2016/0359695 | A1* | 12/2016 | Yadav | H04L 43/04 |
| 2017/0070507 | A1 | 3/2017 | Leconte et al. | |
| 2017/0099310 | A1* | 4/2017 | Di Pietro | H04L 63/1425 |
| 2017/0099311 | A1* | 4/2017 | Kesin | H04L 67/535 |
| 2017/0201537 | A1* | 7/2017 | Caldwell | H04L 63/1416 |
| 2017/0346910 | A1* | 11/2017 | Hsueh | H04L 65/1066 |
| 2017/0357612 | A1* | 12/2017 | Takamiya | G06F 15/1735 |
| 2018/0198812 | A1* | 7/2018 | Christodorescu | H04L 63/1425 |
| 2019/0238575 | A1* | 8/2019 | Hodgman | H04L 63/1433 |
| 2019/0356513 | A1* | 11/2019 | Schubert | H04L 67/53 |
| 2019/0379573 | A1* | 12/2019 | Pontes | H04L 41/06 |
| 2020/0120071 | A1* | 4/2020 | Wimmer | H04L 63/0209 |
| 2020/0304532 | A1* | 9/2020 | Haga | H04L 12/4625 |

FOREIGN PATENT DOCUMENTS

| | | | |
|---|---|---|---|
| CN | 104683332 A | 6/2015 | |
| CN | 204392296 U | 6/2015 | |
| CN | 105204583 A | 12/2015 | |
| CN | 106998333 A | 8/2017 | |
| CN | 109286492 A | 1/2019 | |
| CN | 109510841 A | 3/2019 | |
| EP | 3139548 A1 * | 3/2017 | ....... H04L 12/40032 |
| EP | 3425865 A1 | 1/2019 | |
| WO | WO-2004028107 A2 * | 4/2004 | ........ H04L 63/0209 |
| WO | WO-2018127024 A1 * | 7/2018 | ............ H04L 12/10 |

OTHER PUBLICATIONS

For information purposes only Application of Gaps in Public Security Systems, Information Security and Communications Privacy, No. 10; 6 pages; Oct. 10, 2004 (the foreign NPL is also attached—9 pages total).

* cited by examiner

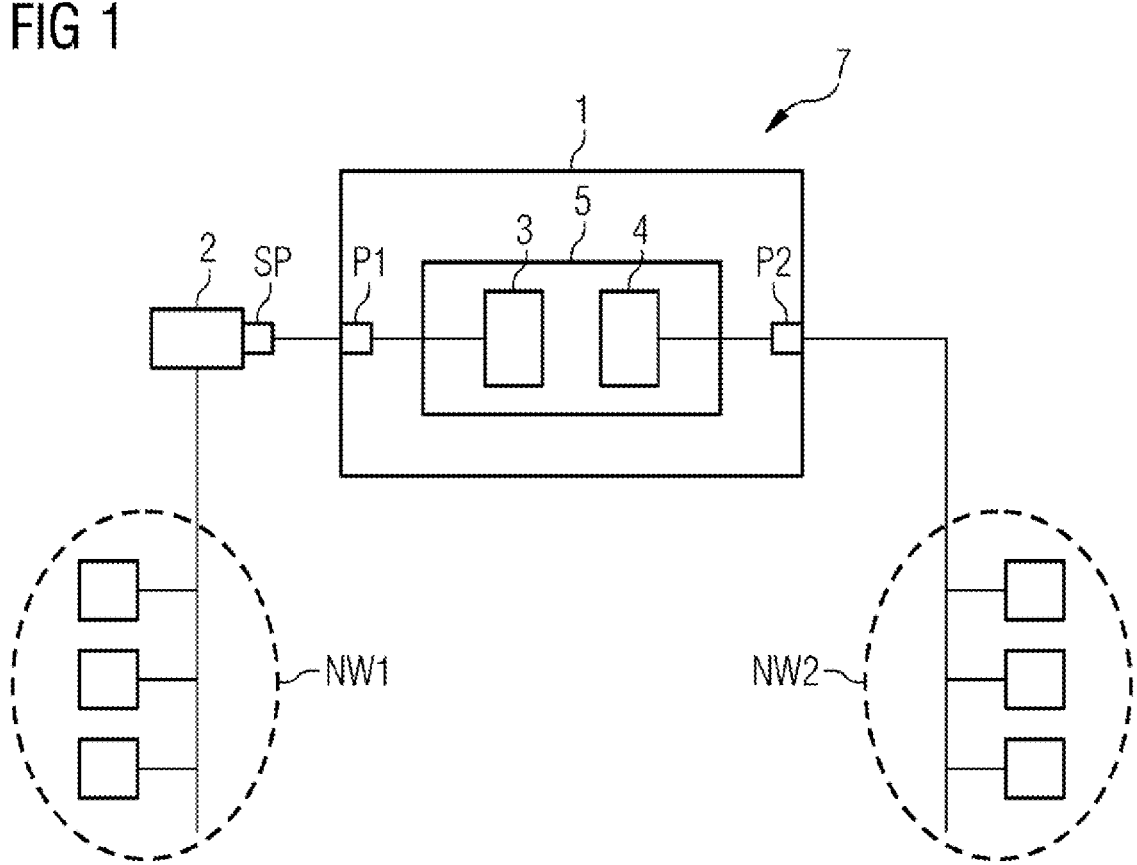
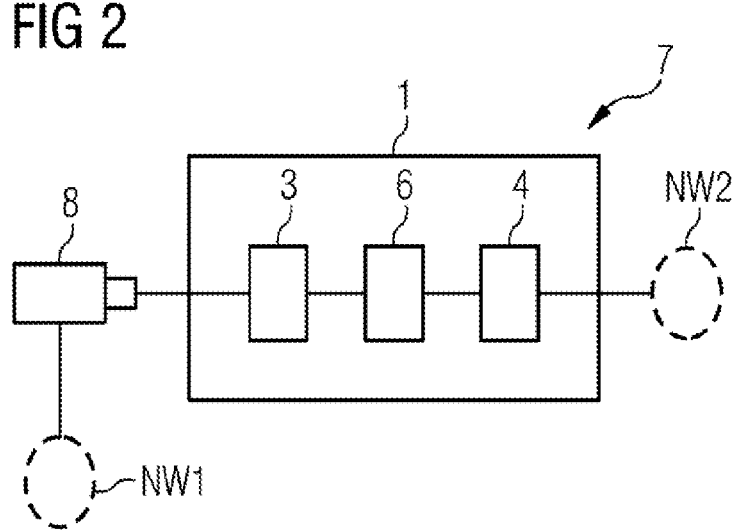

TRANSMISSION DEVICE FOR TRANSMITTING DATA AND DETECTING ANOMALIES

CROSS-REFERENCE TO RELATED APPLICATIONS

This application claims priority to PCT Application No. PCT/EP2020/085502, having a filing date of Dec. 10, 2020, which claims priority to DE Application No. 10 2019 220 248.9, having a filing date of Dec. 19, 2019, the entire contents both of which are hereby incorporated by reference.

FIELD OF TECHNOLOGY

The following relates to a transmission device for transmitting data between a first network and a second network.

BACKGROUND

For secure communication between a safety-critical network, for example a production network or a railway safety network, and an open network, for example a local network or the Internet, transmission devices, such as data diodes or firewalls, are conventionally used, in particular, to enable unidirectional data transmission between the safety-critical network and the open network. These transmission devices are configured, for example, to ensure that no arbitrary data can be transmitted from the open network to the safety-critical network and are also configured, in particular, to protect the safety-critical network from attacks and intrusion attempts.

SUMMARY

An aspect relates to an improved transmission device.

A first aspect proposes a transmission device for transmitting data between a first network and a second network. The transmission device has a first network port for coupling to the first network and a second network port for coupling to the second network and also comprises:
  a first detection unit which is connected at the first network port and is configured to receive data transmitted from the first network via the first network port and to detect anomalies in the received data, and
  a second detection unit which is connected at the second network port and is configured to receive data transmitted from the second network via the second network port and to detect anomalies in the received data.

The transmission device provided makes it possible to monitor and analyze data transmitted from the first network to the transmission device and data transmitted from the second network to the transmission device by the first and second detection units in order to thus detect anomalies in the first and second networks. At the same time, the transmission device provided makes it possible for the first network to be separated from the second network in order to ensure that no arbitrary data can be transmitted from the second network to the first network.

In detail, using the first detection unit makes it possible to detect anomalies, such as discrepancies in the data transmitted from the first network to the transmission device, and using the second detection unit simultaneously makes it possible to detect anomalies, such as attacks or intrusion attempts on the transmission device from the second network, while the first network is simultaneously separated from the second network.

This results in reliable and optimized detection of anomalies in the first and second networks, thus increasing the security when transmitting data between the first network and the second network.

A network port, such as the first or the second network port, is, in particular, in the form of a physical network port. In embodiments, the physical network port may have an RJ-45 connection, an M12 connection or a single-pair Ethernet connection in order to be respectively connected or coupled to the first network or the second network. The transmission device may comprise further network ports in addition to the first and second network ports, for example. The first and/or the second network port may also be part of a network address which makes it possible to assign TCP connections ("Transmission Control Protocol") and UDP connections ("User Datagram Protocol") and data packets to servers and/or clients arranged in the first and/or second network.

There is an anomaly in the received data or in data currently being received, in particular, when the data currently being received from the first and/or the second network have an irregularity or discrepancy in comparison with older received data. It is still possible, in particular, for the data received from the first network to be examined with regard to a discrepancy with respect to older received data, whereas the data received from the second network are examined for a match with attack signatures. This is advantageous if the first network is, for example, an industrial (control) network in which there are fixed communication patterns, and the second network is, for example, an open or public network, such as the Internet, with various or changing communication patterns.

The transmission device comprises, in particular, a CPU ("Central Processing Unit") in which the first detection unit and the second detection unit are implemented. The first CPU and the second CPU are connected to one another, in particular, and have, for example, a common memory, a common memory area or a serial connection each. The respective unit, for example the first detection unit or the second detection unit, may be implemented using hardware and/or software. In the case of a hardware implementation, the respective unit may be in the form of a device or part of a device, for example in the form of a computer or a microprocessor or a control computer of a vehicle. In the case of a software implementation, the respective unit may be in the form of a computer program product, a function, a routine, part of a program code or an executable object.

According to one embodiment, the transmission device is configured to execute the first detection unit and the second detection unit in a parallel manner.

This embodiment has the advantage that the first and second detection units are executed at the same time or in a parallel manner or are active or operating at the same time. This results in reliable and optimized detection of anomalies in the first and second networks, thus increasing the security when transmitting data between the first network and the second network.

"Parallel" is understood as meaning, in particular, the fact that the transmission device is configured to execute or operate the first and second detection units synchronously, concurrently, at the same time or simultaneously.

According to a further embodiment, the first detection unit is configured to transmit a first detection signal at least to the second detection unit when anomalies are detected in the received data, and the second detection unit is configured to transmit a second detection signal at least to the first detection unit when anomalies are detected in the received data.

This embodiment makes it possible for the first detection unit to be able to signal to the second detection unit, by the first detection signal, when an anomaly is detected in the data received by the first detection unit. Conversely, the second detection unit can signal to the first detection unit, by the second detection signal, when an anomaly is detected in the data received by the second detection unit.

It is therefore possible for the first and second detection units to be able to inform one another of when an anomaly occurs in one detection unit and/or in both detection units. This results in reliable and optimized detection of anomalies in the first and second networks, thus increasing the security when transmitting data between the first network and the second network.

A detection signal, such as the first or the second detection signal, is in the form of a message, in particular. Depending on the respective detection unit, the message can be transmitted to the transmission device, the first detection unit, the second detection unit and/or a computer, such as a server or a client connected to the transmission device.

According to a further embodiment, the anomalies which can be detected by the first detection unit comprise a first anomaly type and the anomalies which can be detected by the second detection unit comprise a second anomaly type, wherein the first anomaly type differs from the second anomaly type.

According to a further embodiment, the first detection unit is configured to detect the first anomaly type if, on the basis of the data received from the first network, it is possible to derive at least one new end point and/or a discrepancy of a network topology in the first network, and the second detection unit is configured to detect the second anomaly type if, on the basis of the data received from the second network, it is possible to derive at least one attack on the second detection unit from the second network via the second network port.

It is possible to detect different anomaly types, such as the first and second anomaly types, by the first and second detection units. This results in reliable and optimized detection of anomalies in the first and second networks, thus increasing the security when transmitting data between the first network and the second network.

An end point or a new end point is, in particular, a subscriber of the first network and/or of the second network. A subscriber is, for example, a computer such as a server, a client or a router.

The discrepancy is present, in particular, when a comparison of an older network topology of the first network with a current network topology of the first network reveals that certain subscribers in the older network topology have been removed or added, for example, in comparison with the current network topology or their state has changed.

The first and second anomaly types are derived, in particular, by forming a threshold value in the data respectively received by the respective detection unit. Furthermore, in embodiments the derivation may be effected by stipulating at least one range that indicates which discrepancy obtained is still permissible.

In embodiments, the attack may be derived from the fact that, during the attack or even before the attack, there is a discrepancy which indicates that an attack or an attempted attack has taken place or is currently taking place. The attack can be derived, for example, from a discrepancy in the data received from the second network. The attack may be a software attack, in particular a hacker attack. A software attack is, in particular, an attack on the second detection unit from the second network via the second network port. The attack may also comprise an attempted attack and/or an intrusion attempt on the transmission device. The transmission device is configured, in particular, to connect the first network to the second network. In embodiments, the state or the data of the first network, on the one hand, may be monitored using the first detection unit of the transmission device, whereas attacks or intrusion attempts on the transmission device from the second network can be detected, on the other hand, using the second detection unit of the transmission device.

According to a further embodiment, the transmission device is configured to receive the data from the first network via a network switch arranged between the first network and the first network port, wherein at least one input of the network switch is connected to the first network for the purpose of transmitting data and a mirror port in the form of an output of the network switch is connected to the first network port for the purpose of transmitting data.

The use of a network switch having a mirror port makes it possible to provide the entire data traffic of the first network at the first network port for the transmission device. This makes it possible for the transmission device to receive, monitor and analyze the data traffic of each subscriber of the first network. This increases the reliability when an anomaly is detected in the first network and therefore the security when processing data in the first network and in the transmission device.

In particular, a first connection section is arranged between the first network and the network switch, a second connection section is arranged between the network switch and the transmission device, and a third connection section is arranged between the transmission device and the second network. The first connection section establishes, in particular, a connection between the first network and the network switch. In embodiments, the second connection section may establish a connection between the network switch and the transmission device. The third connection section establishes, for example, a connection between the second network and the transmission device. The first, second and/or third connection section is, in particular, wired, for example in the form of at least one copper line or an aluminum line, and/or optical in the form of at least one fiber optic cable. The network switch is in the form of a switch, in particular.

The mirror port of the network switch is used, in particular, to mirror the network traffic of the first network in order to thus provide the transmission device with the entire data and/or network traffic of the first network at the first network port.

According to a further embodiment, the transmission device also comprises a first CPU, in which the first detection unit is implemented, and a second CPU, in which the second detection unit is implemented.

The first CPU is therefore implemented in a manner physically separate from the second CPU or is implemented in a manner physically isolated from the second CPU. The first CPU may therefore be implemented independently of the second CPU. In particular, the first CPU and the second CPU have a common memory such as a dual-RAM ("Random Access Memory") and/or a common serial connection.

This has the advantage that, in the event of an attack on the second detection unit, an influence on the first detection unit by this attack is prevented since the first detection unit is implemented on a first CPU which is isolated from the second CPU. This increases the reliability when operating the transmission device, in particular when operating the first and second detection units, and therefore increases the security when transmitting data between the first and second networks.

The CPU, such as the first CPU or the second CPU, is a central processing unit or a processor.

According to a further embodiment, the transmission device is configured to provide the second network with a routing table comprising a plurality A of IP addresses of subscribers from the first network.

The routing table is, in particular, a table which provides information on which subscribers of a network, such as the first network, can be reached using which IP addresses or which IP addresses are assigned to the subscribers. Another network, such as the second network, therefore has information relating to which IP address can be used to reach a subscriber of the first network from the second network.

According to a further embodiment, the transmission device is also configured to provide the second network with at least one particular IP address of a particular subscriber from the first network.

The routing table provided provides the second network with at least one particular IP address of a particular subscriber from the first network.

This particular IP address provided is used, in particular, as a trap which has a technical end point. The trap may also be referred to by the term "honeypot". If, in particular, complete network segments having a plurality of subscribers of the first network are faked, this can be referred to as a "honeynet". If, for example, an attacker wishes to attack the particular subscriber via the transmission device and/or the second detection unit by the particular IP address assigned to the subscriber, the attack ends at the technical end point. The technical end point is isolated from the first and second networks, in particular. Therefore, the attacker is deliberately deceived using the particular IP address and the routing table in order to increase the security and reliability when operating the transmission device and the first network.

According to a further embodiment, the transmission device is configured to transmit data between the first network and the second network in a data link layer, layer 2 according to the OSI/ISO layer model.

According to a further embodiment, the first detection unit and the second detection unit each comprise an intrusion detection system.

The intrusion detection system (IDS) is, in particular, a security technology which detects the unauthorized intrusion in a network if, for example, malware uses security gaps of a system with the aid of so-called exploit codes. The intrusion detection system comprises, in particular, a network intrusion detection system (NIDS). The relevant network, for example the first network and/or the second network, can be monitored and effectively searched for anomalies by an IDS or a NIDS.

According to a further embodiment, the first network comprises a control network, in particular a production network or a railway safety network, and the second network comprises a diagnostic network, a local network or the Internet.

The first network is, in particular, in the form of a safety-critical network, whereas the second network is in the form of an open network. The first network may also be referred to as a network having a high security requirement, whereas the second network is referred to as a network with a low security requirement.

A production network is used, in particular, in a production plant. The production plant comprises, in particular, a plurality of machines and computers which are connected to one another via the production network.

A railway safety network may comprise control and safety technology for a rail infrastructure.

The control network also comprises, in particular, a road safety network which has control and safety technology for a road infrastructure.

A local network comprises, for example, a LAN ("Local Area Network") and/or a WLAN ("Wireless Local Area Network").

The first and second networks each comprise, in particular, at least one end point which is in the form of a respective subscriber. The first network and/or the second network each comprise, in particular, a plurality of subscribers which are connected to one another and thereby form the respective network.

According to a further embodiment, the transmission device is partially or completely in the form of a unidirectional data diode, a firewall or a gateway.

A unidirectional data diode is, in particular, a one-way communication device which makes it possible to separate the first and second networks without any physical repercussions. In particular, the unidirectional data diode is in the form of a "Data Capture Unit" (DCU). Separation without any "physical" repercussions is present, in particular, when the separation without any repercussions physically separates the first and second networks on account of physical components in the unidirectional data diode.

A firewall is, in particular, a component which is implemented in hardware and/or software, in particular in software, and is configured to establish a connection between a first network and a second network. The firewall may likewise be in the form of a unidirectional firewall which makes it possible to separate the first and second networks without any logical repercussions. The term separation without any "logical" repercussions is understood in the present case as meaning, in particular, if the separation without any repercussions is effected by using algorithms when the firewall is implemented in software.

A gateway is, in particular, a component which is implemented in hardware and/or software and is configured to establish a connection between a first network and a second network. The gateway may likewise be in the form of a unidirectional gateway which makes it possible to separate the first and second networks without any physical or logical repercussions.

Furthermore, in embodiments the unidirectional data diode, the unidirectional firewall and the unidirectional gateway are each configured, in particular, to allow only approved and/or specially marked data for transmission from the second network into the first network.

The term "separation without any repercussions" is understood as meaning, in particular, the fact that changes or attacks in the second network prevent an influence on the first network.

In the present case, the term "partially" is understood as meaning, in particular, the fact that the transmission device comprises yet further components in addition to the unidirectional data diode, the firewall or the gateway. For example, the unidirectional data diode is part of the transmission device, wherein the transmission device has yet further components.

In the present case, the term "completely" is understood as meaning, in particular, the fact that the transmission device, in its entirety, is in the form of a unidirectional data diode, a firewall or a gateway.

According to a further embodiment, the gateway is arranged between the first detection unit and the second detection unit, and an input of the first detection unit is connected to an external network switch and an output of the first detection unit is connected to the gateway, wherein the gateway is also configured to communicate with the first detection unit using an internal IP address of the first detection unit, wherein an input of the second detection unit is connected to the gateway and an output of the second detection unit is connected to the second network.

According to a further embodiment, at least the first detection unit, the second detection unit, the first network port and the second network port are implemented in a common housing.

The components mentioned in this embodiment, including the transmission device itself, are therefore implemented in a common housing, in particular.

A housing or a common housing is, in particular, in the form of a housing of a processor or of a computer chip, for example in the form of an integrated circuit (IC). In embodiments, a housing or a common housing may also be in the form of a common housing of a device or, for example, in the form of a common implementation on an FPGA ("Field Programmable Gate Array").

Further possible implementations of the invention also comprise not explicitly mentioned combinations of features or embodiments described above or below with respect to the exemplary embodiments. In this case, a person skilled in the art will also add individual aspects as improvements or additions to the respective basic form of embodiments of the invention.

BRIEF DESCRIPTION

Some of the embodiments will be described in detail, with reference to the following figures, wherein like designations denote like members, wherein:

FIG. 1 shows a schematic block diagram of a first exemplary embodiment of a transmission device for transmitting data; and FIG. 2 shows a schematic block diagram of a second exemplary embodiment of a transmission device for transmitting data.

DETAILED DESCRIPTION

FIG. 1 shows a schematic block diagram of a first exemplary embodiment of a transmission device 1 for transmitting data between a first network NW1, for example comprising a production network, and a second network NW2, for example comprising a local network. This transmission of data is carried out, in particular, in a data link layer, layer 2 according to the OSI/ISO layer model. In a further embodiment, the first network NW1 may comprise a railway safety network, whereas the second network NW2 comprises the Internet.

In the first embodiment, the transmission device 1 is completely in the form of a unidirectional data diode. In a further embodiment, the transmission device 1 may be partially or completely in the form of a firewall (not shown) or a gateway 6 (see FIG. 2).

In embodiments, the transmission device 1 has a first network port P1 for coupling to the first network NW1 and a second network port P2 for coupling to the second network NW2. The transmission device 1 also comprises a first detection unit 3 and a second detection unit 4. In the first embodiment, the transmission device 1 comprising the first detection unit 3, the second detection unit 4, the first network port P1 and the second network port P2 is implemented in a common housing 7.

In embodiments, the first detection unit 3 is connected at the first network port P1 and is configured to receive data transmitted from the first network NW1 via the first network port P1 and to detect anomalies in the received data. The first detection unit 3 is also configured to transmit a first detection signal at least to the second detection unit 4 when anomalies are detected in the received data.

In embodiments, the second detection unit 4 is connected at the second network port P2 and is configured to receive data transmitted from the second network NW2 via the second network port P2 and to detect anomalies in the received data. The second detection unit 4 is also configured to transmit a second detection signal at least to the first detection unit 3 when anomalies are detected in the received data.

In embodiments, the transmission device 1 may be configured to execute the first detection unit 3 and the second detection unit 4 in a parallel manner. Furthermore, in embodiments the first and second detection units 3, 4 each comprise an intrusion detection system, in particular.

The anomalies which can be detected by the first detection unit 3 comprise a first anomaly type, in particular, wherein the first detection unit 3 is configured to detect the first anomaly type if, on the basis of the data received from the first network NW1, it is possible to derive at least one new end point or a discrepancy of a network topology in the first network NW1.

In particular, the anomalies which can be detected by the second detection unit 4 comprise a second anomaly type, wherein the second detection unit 4 is configured to detect the second anomaly type if, on the basis of the data received from the second network NW2, it is possible to derive at least one attack on the second detection unit 4 from the second network NW2 via the second network port P2.

Consequently, the first anomaly type differs from the second anomaly type, in particular.

In FIG. 1, a network switch 2 is also arranged between the first network NW1 and the first network port P1.

In this case, the transmission device 1 is configured to receive the data from the first network NW1 via the network switch 2. At least one input of the network switch 2 is connected to the first network NW1 for the purpose of transmitting data. A mirror port SP in the form of an output of the network switch 2 is connected to the first network port P1 for the purpose of transmitting data.

In a further embodiment, the transmission device 1 comprises a first CPU, in which the first detection unit 3 is implemented, and a second CPU, in which the second detection unit 4 is implemented.

In an embodiment, the transmission device 1 may be configured to provide the second network NW2 with a routing table comprising a plurality of A of IP addresses of subscribers from the first network NW1. The transmission device 1 is also configured to provide the second network NW2 with at least one particular IP address of a particular subscriber from the first network NW1.

FIG. 2 shows a schematic block diagram of a second exemplary embodiment of a transmission device 1 for transmitting data. In this case, the transmission device 1 comprises a gateway 6. In the second embodiment, the transmission device 1 comprising the first detection unit 3, the second detection unit 4 and the gateway 6 is implemented in a common housing 7.

The gateway 6 is arranged, in particular, between the first detection unit 3 and the second detection unit 4.

An input of the first detection unit 3 is connected to an external network switch 8 and an output of the first detection unit 3 is connected to the gateway 6. In this case, the gateway 6 is configured to communicate with the first detection unit 3 using an internal IP address of the first detection unit 3. An input of the second detection unit 4 is connected to the gateway 6, whereas an output of the second detection unit 4 is connected to the second network NW2.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A transmission device for transmitting data between a first network and a second network, wherein the transmission device has a first network port for coupling to the first network and a second network port for coupling to the second network and also comprises:
   a first detection unit which is connected at the first network port and is configured to receive data transmitted from the first network via the first network port and to detect anomalies in the received data; and
   a second detection unit which is connected at the second network port and is configured to receive data transmitted from the second network via the second network port and to detect anomalies in the received data;
   wherein the first detection unit is configured to transmit a first detection signal at least to the second detection unit when anomalies are detected in the received data, and the second detection unit is configured to transmit a second detection signal at least to the first detection unit when anomalies are detected in the received data.

2. The transmission device as claimed in claim 1, wherein the transmission device is configured to execute the first detection unit and the second detection unit in a parallel manner.

3. The transmission device as claimed in claim 1, wherein the anomalies detected by the first detection unit comprise a first anomaly type and the anomalies detected by the second detection unit comprise a second anomaly type, wherein the first anomaly type differs from the second anomaly type.

4. The transmission device as claimed in claim 3, wherein the first detection unit is configured to detect the first anomaly type if, on the basis of the data received from the first network, it is possible to derive at least one new end point and/or a discrepancy of a network topology in the first network, and the second detection unit is configured to detect the second anomaly type if, on the basis of the data received from the second network, it is possible to derive at least one attack on the second detection unit from the second network) via the second network port.

5. The transmission device as claimed in claim 1, wherein the transmission device is configured to receive the data from the first network via a network switch arranged between the first network and the first network port, wherein at least one input of the network switch is connected to the first network for the purpose of transmitting data and a mirror port in a form of an output of the network switch is connected to the first network port for the purpose of transmitting data.

6. The transmission device as claimed in claim 1, wherein the transmission device also comprises a first CPU, in which the first detection unit is implemented, and a second CPU, in which the second detection unit is implemented.

7. The transmission device as claimed in claim 1, wherein the transmission device is configured to provide the second network with a routing table comprising a plurality A of IP addresses of subscribers from the first network.

8. The transmission device as claimed in claim 1, wherein the transmission device is configured to provide the second network with at least one particular IP address of a particular subscriber from the first network.

9. The transmission device as claimed in claim 1, wherein the transmission device is configured to transmit data between the first network and the second network in a data link layer, layer 2 according to an OSI/ISO layer model.

10. The transmission device as claimed in claim 1, wherein the first detection unit and the second detection unit each comprise an intrusion detection system.

11. The transmission device as claimed in claim 1, wherein the first network comprises a control network, and the second network comprises a diagnostic network, a local network, or Internet.

12. The transmission device as claimed in claim 1, wherein the transmission device is partially or completely in a form of a unidirectional data diode, a firewall, or a gateway.

13. The transmission device as claimed in claim 12, wherein the gateway is arranged between the first detection unit and the second detection unit, and an input of the first detection unit is connected to an external network switch and an output of the first detection unit is connected to the gateway, wherein the gateway is also configured to communicate with the first detection unit using an internal IP address of the first detection unit, wherein an input of the second detection unit is connected to the gateway and an output of the second detection unit is connected to the second network.

14. The transmission device as claimed in claim 1, wherein at least the first detection unit, the second detection unit, the first network port and the second network port are implemented in a common housing.

* * * * *